United States Patent
Ravichandran et al.

(10) Patent No.: US 9,830,534 B1
(45) Date of Patent: Nov. 28, 2017

(54) OBJECT RECOGNITION

(71) Applicant: A9.com, Inc., Palo Alto, CA (US)

(72) Inventors: Avinash Aghoram Ravichandran, Seattle, WA (US); Matias Omar Gregorio Benitez, Seattle, WA (US); Rahul Bhotika, Redmond, WA (US); Scott Daniel Helmer, Seattle, WA (US); Anshul Kumar Jain, Jersey City, NJ (US); Junxiong Jia, Mercer Island, WA (US); Rakesh Madhavan Nambiar, Seattle, WA (US); Oleg Rybakov, Seattle, WA (US)

(73) Assignee: A9.com, Inc., Palo Alto, CA (US)

(*) Notice: Subject to any disclaimer, the term of this patent is extended or adjusted under 35 U.S.C. 154(b) by 50 days.

(21) Appl. No.: 14/971,691

(22) Filed: Dec. 16, 2015

(51) Int. Cl.
*G06K 9/62* (2006.01)
*G06T 7/00* (2017.01)
*G06K 9/52* (2006.01)
*G06K 9/66* (2006.01)
*G06T 7/60* (2017.01)

(52) U.S. Cl.
CPC ........... *G06K 9/6267* (2013.01); *G06K 9/52* (2013.01); *G06K 9/6215* (2013.01); *G06K 9/66* (2013.01); *G06T 7/0042* (2013.01); *G06T 7/0079* (2013.01); *G06T 7/60* (2013.01); *G06T 2207/20076* (2013.01); *G06T 2207/20081* (2013.01); *G06T 2207/20112* (2013.01)

(58) Field of Classification Search
None
See application file for complete search history.

(56) References Cited

U.S. PATENT DOCUMENTS

2004/0223656 A1* 11/2004 Moreira ................. H04B 1/665
382/240

OTHER PUBLICATIONS

Dai et al, Implicit Relevance Feedback for Content-Based Image Retrieval by Mining User Browsing Behaviors and Estimating Preference, Lecture Notes on Software Engineering, vol. 1, No. 4, Nov. 2013.*

* cited by examiner

*Primary Examiner* — Andrae S Allison
(74) *Attorney, Agent, or Firm* — Hogan Lovells US LLP

(57) ABSTRACT

Approaches introduce a pre-processing and post-processing framework to a neural network-based approach to identify items represented in an image. For example, a classifier that is trained on several categories can be provided. An image that includes a representation of an item of interest is obtained. Rotated versions of the image are generated and each of a subset of the rotated images is analyzed to determine a probability that a respective image includes an instance of a particular category. The probabilities can be used to determine a probability distribution of output category data, and the data can be analyzed to select an image of the rotated versions of the image. Thereafter, a categorization tree can then be utilized, whereby for the item of interest represented the image, the category of the item can be determined. The determined category can be provided to an item retrieval algorithm to determine primary content for the item of interest. This information also can be used to determine recommendations, advertising, or other supplemental content, within a specific category, to be displayed with the primary content.

19 Claims, 6 Drawing Sheets

OBJECT RECOGNITION

BACKGROUND

Users are increasingly utilizing electronic devices to obtain various types of information. For example, a user wanting to obtain information about an object can capture an image of the object and upload that image to an identification service for analysis. An identification service can analyze the image to obtain information associated with the object represented in the image. However, it remains a challenge to enable computing devices to identify various objects and/or features from single category (e.g., shoes) of objects as certain categories have a variety of forms, can be present in any viewpoint, can be captured in a wide range of changing conditions (e.g, changes in orientation, image size, shape, etc.), and can suffer from distractors such as background clutter as well as occlusions. These challenges can be further exacerbated as the number of object categories that need to be identified increase. Thus, users can have difficulty locating the appropriate objects, or may at least have to navigate through many irrelevant results before locating the item of interest. Conventional approaches include using more images during the training of such algorithms, training multiple classifiers, as well as developing more advanced recognition methods. Such approaches usually result in an increase in the time taken to train these classifiers and offer no form of corrective course once such classifiers are trained. In such scenarios, adding a suitable pre-processing and post-processing framework can increase the precision and recall of existing approaches with minimal computational overhead.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches for identifying an item represented in an image. In particular, various embodiments introduce a pre-processing and post-processing framework to a neural network-based approach to identify items represented in an image that can be used to generate recommendations, select advertising, and/or perform various other such tasks.

In accordance with various embodiments, a classifier that is trained on several categories (e.g., clothes, shoes, jewelry, etc.) is provided. An image is obtained that includes a representation of an item of interest. Rotated versions of the image are generated and each of a subset of the rotated images is analyzed to determine a probability that a respective image includes an instance of a particular category. The probabilities can be used to determine a probability distribution of output category data, and the data can be analyzed to select an image of the rotated versions of the image. Thus, the classification result of the classifier includes a classification of the image at a particular viewpoint. As will be described further herein, a categorization tree can then be utilized, whereby for the item of interest represented the image, the category of the item can be determined. The determined category can be provided to an item retrieval algorithm to determine primary content for the item of interest. This information also can be used to determine recommendations, advertising, or other supplemental content, within a specific category, to be displayed with the primary content.

Various other functions and advantages are described and suggested below as may be provided in accordance with the various embodiments.

Figure 1A:
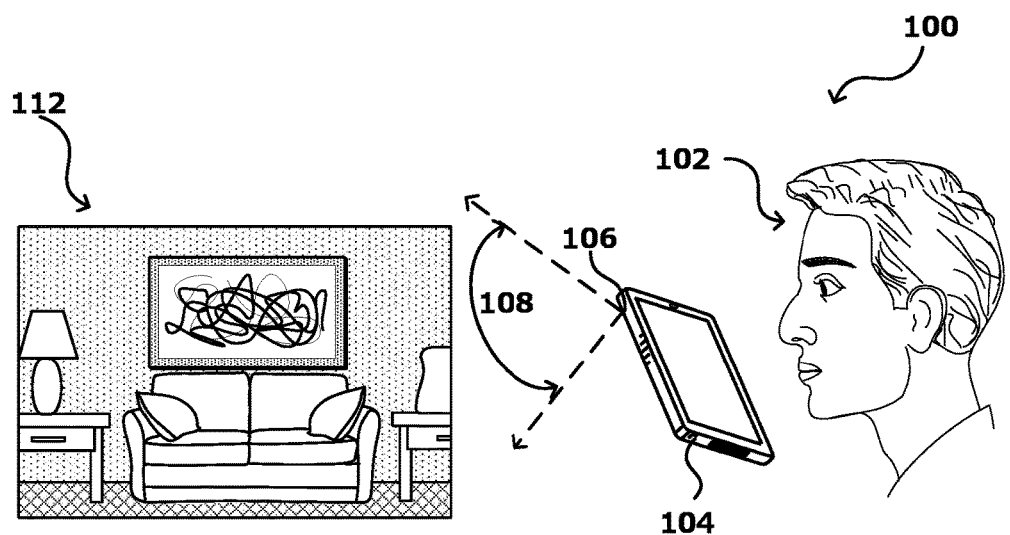
FIGS. 1A and 1B illustrate an example process in which a user can attempt to capture an image in an attempt to locate information about specific items represented in the image in accordance with various embodiments.

FIG. 1A illustrates an example situation 100 in which a user 102 is attempting to locate information about specific items 112 in accordance with various embodiments. Although a portable computing device 104 (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others. In this example, the computing device 104 has at least one camera 106 (or other image capture sensor or element) operable to perform functions such as image and/or video capture. Each camera may be, for example, a charge-coupled device (CCD), a motion detection sensor, or an infrared sensor, or can utilize another appropriate image capturing technology. In this example, the user can position the device such that one or more items of interest 112 are within a field of view 108 of the at least one camera 106 on the computing device. The camera might capture video, such that a "live" view of the captured video information can be displayed on a display screen 152 of the computing device 104, as illustrated in the example situation 140 of FIG. 1B. In other embodiments, the camera might capture a still image 154 showing a representation of the item(s) of interest. In yet other embodiments, the image can be obtained in any one of a number of different ways, as may include downloading or otherwise obtaining the image. In at least some embodiments, the image and/or a frame of the video can be analyzed, such as by analyzing on the device or uploading across a network to a service for analyzing image content.

Figure 1B:
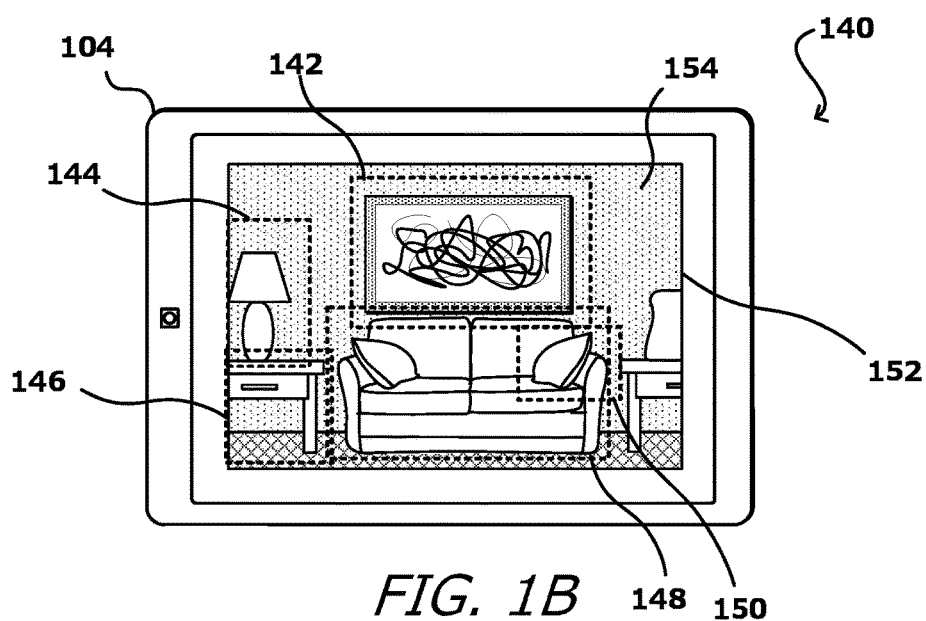

Unfortunately, attempting to recognize an item, particularly a set of items, based on a mobile query image such as that illustrated in FIG. 1B can be difficult and extremely resource intensive. For example, it can be difficult to identify which portion of the image represents an item of interest to the user. As the image(s) are obtained, various objects and/or features from single category of objects (e.g., tables) can be challenging to identify as certain classes have a variety of forms, can be present in any viewpoint, can be captured in a wide range of changing conditions (e.g., changes in orientation, image size, shape, etc.), and can suffer from distractors such as background clutter as well as occlusions. These challenges can be further exacerbated as the number of object categories that need to be identified increase. For instance, in the example image 154 there are lamps, 144 vases, end tables 146, pillows 150, picture frames 142, a couch 148, as well as other items represented in the image. Although a user can identify each of the items, it can be significantly more difficult for a computer vision (or other such) algorithm to analyze the image, determine the portion corresponding to the specific item, and then segment that portion from the background or remaining portion of the image. Further, even if the item can be successfully segmented from the image and identified, a user wanting to purchase a product might have to access an electronic marketplace in order to search the types of products offered through that marketplace to find the item. Such a process can be time consuming and potentially frustrating for a user, which can result in the user not locating an item of interest and the marketplace not completing a transaction. Further still, conventional object recognition approaches may not be able to successfully and/or quickly identify objects, which can potentially be frustrating for a user.

Accordingly, approaches in accordance with various embodiments attempt to include a pre-processing and post-processing framework to a neural network-based approach that includes a classifier trained on several categories (e.g., apparel, shoes, etc.). The pre-processing approach can include, for example, generating a probability distribution of output category data to identify an image that includes a viewpoint of an item of interest that includes an instance of a particular category. For example, in the situation where a classifier is not invariant to rotation, an image of an item in a viewpoint other than the canonical viewpoint(s) may result in a false positive. In order to address this issue, an input image can be rotated, and analyzed using the classifier for each viewpoint of the original image, where one of the rotated images is determined to be in a canonical viewpoint that the classifier can recognize. In a post-processing approach, a categorization tree can then be utilized, whereby for the item of interest represented the image, the category of the item can be determined. Various other approaches can be implemented in to increase overall performance of the system, as may include using stop lists, hierarchy classes, and various other approaches as will be described further herein.

As a first step, a neural network-based approach can be used to train a classifier algorithm on one or more categories (e.g., apparel, shoes, etc.) An example neural network is a convolutional neural network (CNN). Convolutional neural networks are a family of statistical learning models using in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. CNN is trained on a similar data set (which includes dress, pants, watches etc.), so it learns the best feature representation for this type of image. Trained CNN is used as a feature extractor: an input image is passed through the network and intermediate outputs of layers can be used as feature descriptor of the input image. Similarity scores can be calculated based on the distance between the one or more feature descriptors and the one or more candidate content feature descriptors and used in a categorization tree as described herein.

A content provider can thus analyze a set of images to determine a probability that a respective image includes an instance of a particular category. For example, for an image, rotated versions of the image can be generated. The increments of rotation between the multiple rotated versions can include, for example, one degree, five degrees, forty-five degrees, ninety-degrees, or some other increment. The classifier algorithm can be configured to analyze at least a portion of the rotated versions of the image. The classifier can generate, for each analyzed image of the rotated images, a classification vector, categorization value, weighting, or other score that indicates a probability that a respective image includes an instance of a certain category of a categorization tree. A category can refer to, for example, a class or division of items regarded as having particular shared characteristics. An example category can be Sports and Outdoors, Beauty, Health and Grocery, Books, Movies, Music and Games, Clothing, Shoes, and Jewelry, among others.

The classification vector can include an entry (i.e., a probability) for each of the categories the classification algorithm is trained to recognize. The probabilities can be utilized to generate a probability distribution of output category data. Using an entropy algorithm or other such selection algorithm or approach, the probability distribution of output category data is analyzed to select an image of the rotated versions of the image. Thus, the classification result of the classifier includes a classification of the image at a particular viewpoint. As will be described further herein, a categorization tree can then be utilized, whereby for an item of interest represented in a query image, the categorization tree can be consulted to determine a category of the item.

Figure 2:
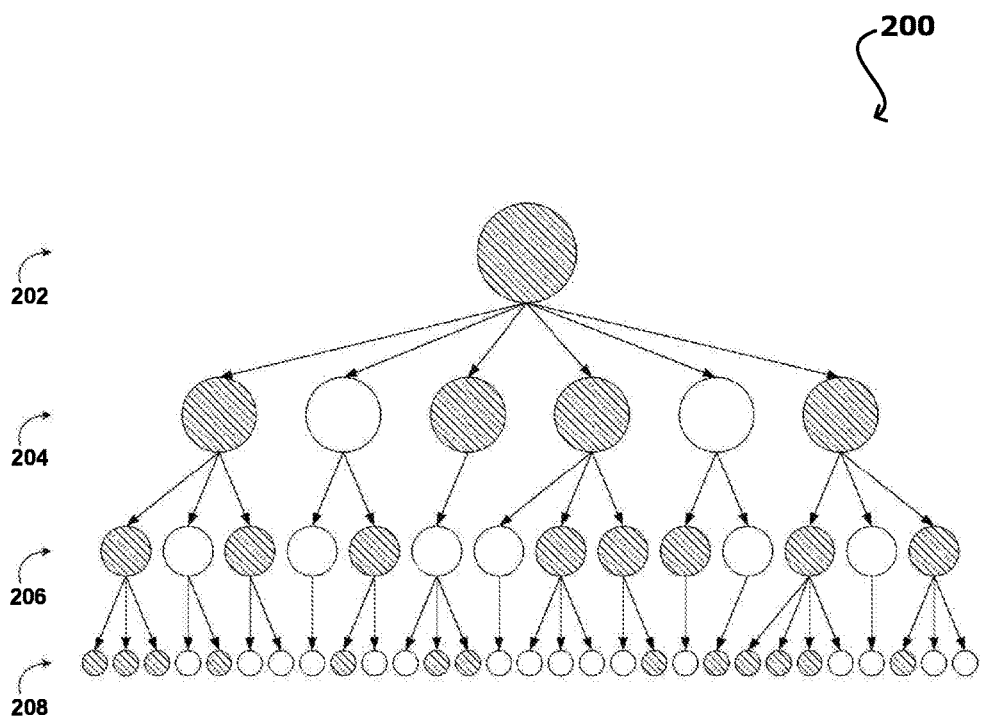
FIG. 2 illustrates an example categorization tree that can be utilized in accordance with various embodiments.

In a second step, a categorization tree can be built or obtained. Any suitable automatic and/or manual technique may be utilized to build and/or define categories in the categorization tree, set and/or define some categories in the categorization tree as sub-categories of other categories in the categorization tree, and/or assign content in the collection of content to appropriate categories in the categorization tree. Such techniques are well known in the art, and need not be described here in detail. FIG. 2 depicts aspects of at least a portion of an example categorization tree 200 that can be utilized in accordance with at least one embodiment. In accordance with various embodiments, information is often organized according to a defined taxonomy or classification. For example, a content provider (e.g., an online retailer) can organize various products using a navigational hierarchy that categorizes products into to one or more categories. Some of these categories may be sub-categories of a broader category and thus may be nested within one or more broader category. For example, a pair of men's dress shoes may be associated with the classification "Clothing & Shoes," "Men," "Shoes," "Dress Shoes." Further, the category "Dress Shoes" may be nested as a sub-category of the broader category "Shoes," the category "Shoes" may be nested as a sub-category of the broader category "Men," and the category "Men" may be nested as a sub-category of the broader category "Clothing & Shoes." In another example, a content provider may categorize an article about 3D printing under the categories: "Computer printing," "Industrial robotics," "3D Manufacturing," and any of these categories may be sub-categories of another.

As shown in example categorization tree 200, the subset of the tree illustrated in FIG. 2 includes a representation of a hierarchy of categories. The example categorization tree 200 has a first level 202 containing the root category of the categorization tree 200, second and third levels 204, 206 containing categories with one or more sub-categories or child categories, and a fourth level 208 containing childless categories or leaf categories of the categorization tree 200. As used herein, a "category" may refer to any category that is organized within a taxonomy or classification. Such a category may include sub-categories or may be a sub-category of other categories. In FIG. 2, categories in the subset of the categorization tree 200 are indicated by a circle filled with diagonal lines.

Categories in the categorization tree may be referenced and/or defined by category data. The example category data includes multiple data objects each corresponding to one of a category data object, a parent item data object, a child item data object, and an image data object. The category data object may reference and/or define a particular category of the categorization tree with a category identifier (ID) corresponding to the category. For example, each category in the categorization tree may be associated with a uniquely identifying string of alphanumeric characters, and the category ID may be a copy of the uniquely identifying string of the category. The category data object may further reference an item set of content in the collection of content corresponding to items that are categorized by the category having the category ID. For example, each item referenced by the collection of content may be associated with a uniquely identifying string of alphanumeric characters (an "item ID"), and the item set may include copies corresponding to the categorized items. The category data object may yet further reference an image set of images corresponding to items referenced by the item set. For example, each image corresponding to content in the collection of content corresponding to one or more items may be associated with a uniquely identifying string of alphanumeric characters (an "image ID"), and the image set may include copies corresponding to the referenced images. The category data object may still further include a similarity descriptor set including copies of similarity descriptors (e.g., histogram descriptors) corresponding to the images referenced by the image set.

An example process can facilitate visual similarity searches in accordance with at least one embodiment. For example, a request may be received to identify images in a collection of images that are visually similar to a query image. For example, the search request may include the query image or a reference to the query image. Rotated versions of the image can be analyzed using the classifier algorithm, and one of the images can be selected as the classification output. Using the classification output, a set of high level categories of the categorization tree may be identified. For example, the set of high level categories may include each category in a relatively high level of the categorization tree (e.g., corresponding to level 204 of the categorization tree 200 of FIG. 2). To determine whether to traverse the levels of the categorization tree to a more specific category at a different level (e.g., level 208), the categorization vector associated with the selected image is compared to a threshold at a respective level of the categorization tree to determine a level at which the categorization vector does not meet the threshold for a given level of the categorization tree. For example, each of levels 202, 204, 206, and 208 can be associated with a threshold. In the situation where categorization vector satisfies a particular threshold, for example threshold at level 202, the categorization vector is compared to the threshold at level 204, and so on, until the categorization vector does not meet the threshold for a given level.

Determining a threshold for a given level can be determined in any one of a number of ways. For example, a first of the set of high level categories may be selected. A lower set size threshold may be identified for the selected category. The lower set size threshold can be determined based at least in part on (e.g., as a linear function of) a total number of items categorized by the selected category. Alternatively, or in addition, the lower set size threshold corresponding to the selected category may be specified in a configuration file. An upper size threshold may be identified for the selected category. The upper set size threshold can be determined based at least in part on (e.g., as a linear function of) a total number of items categorized by the selected category. Alternatively, or in addition, the upper set size threshold corresponding to the selected category may be specified in the configuration file. It may be determined whether there are more high level categories for which to identify set size thresholds.

For the determined level, a category can be selected and one or more images associated with the selected category can be determined. For example, a set of images associated with content in the collection of content corresponding to items that are categorized by the selected category can be determined. Local-texture, global-shape, local-shape descriptors, or other features are obtained or determined for the query image. If the query image is not part of the collection and does not already have associated descriptors, a search module or other module may generate local-texture, global-shape, and/or local-shape descriptors for the query image. If the query image is part of the collection, the descriptors for the query image can be obtained an appropriate location storing the descriptors for the query image.

The collection of images may be searched to identify a set of content images that are similar to the query image. Since descriptors have been calculated or obtained for the query image, comparing images can be accomplished by comparing the descriptors of query images to the descriptors of the images of the collection. For example, distances may be determined between the local-texture, global-shape, and local-shape descriptors of the query image and the local-texture, global-shape, and local-shape descriptors of the images in the collection of images. According to some embodiments, dot product comparisons are performed between the histogram descriptors of the query image and the corresponding histogram descriptors of the images of the collection. The dot product comparisons are then normalized into similarity scores. It should be appreciated that instead of a dot product comparison, any distance metric could be used to determine distance between the different types of descriptors, such as determining the Euclidian distance between the descriptors.

After the similarity scores are determined, a set of nearest descriptors may be selected. For example, the search module may select a subset of content descriptors associated with images of the collection that are nearest the query descriptors as determined by the similarity scores. Images in the collection associated with the subset of nearest descriptors may be provided for analysis and/or presentation. For example, the search module may determine images in the collection that match the set of nearest content descriptors selected at step and provide at least reference to the matching images. As mentioned, in various embodiments the references can be used with a recommendations module to generate recommendations for a user based on information known or obtainable with respect to the items for the matching images.

In accordance with various embodiments, various approaches can be utilized in a post-processing pipeline to improve classification. In one such approach, a stop list can be implemented to prevent the classifier from classifying images as one of the classes that the classifier has poor performance on. For example, an ignored category set can be identified. For example, a subset of the categorization tree may be identified to be ignored for the purposes of visual similarity searches. The ignored category set can be identified based at least in part on one or more attributes of categories in the categorization tree. For example, where the categories of the categorization tree categorize content in the collection of content corresponding to items of apparel such as shoes, the categories may have an attribute characterizing them as corresponding to a wearable dimension of the item of apparel (e.g., size) or a non-wearable dimension (e.g., color), and the categories corresponding to wearable dimensions can be identified as part of the ignored category set. Alternatively, or in addition, categories in the categorization tree that are to be added to the ignored category set may be specified explicitly (e.g., with an "ignore for purposes of visual similarity" attribute) and/or in the configuration file.

A candidate set of categories may be then established for the determined level. For example, an item module may add each category in a sub-tree of the categorization tree that is rooted at one or more of the categories in the high level category set identified to the candidate set of categories. A next (e.g., a first) category in the candidate set of visually significant categories may be selected. It may be determined whether the selected category is in the ignored category set. It may be determined whether the selected category is associated with a visual distinction. For example, the visually significant category data maintenance module may determine whether the selected category is associated with a visual distinction based at least in part on one or more attributes of the selected category (e.g., an "is visually distinctive" attribute). Alternatively, this step may be omitted so that each category in the candidate set of visually significant categories that is not also in the ignored category set is assumed to be associated with a visual distinction.

Figure 3:
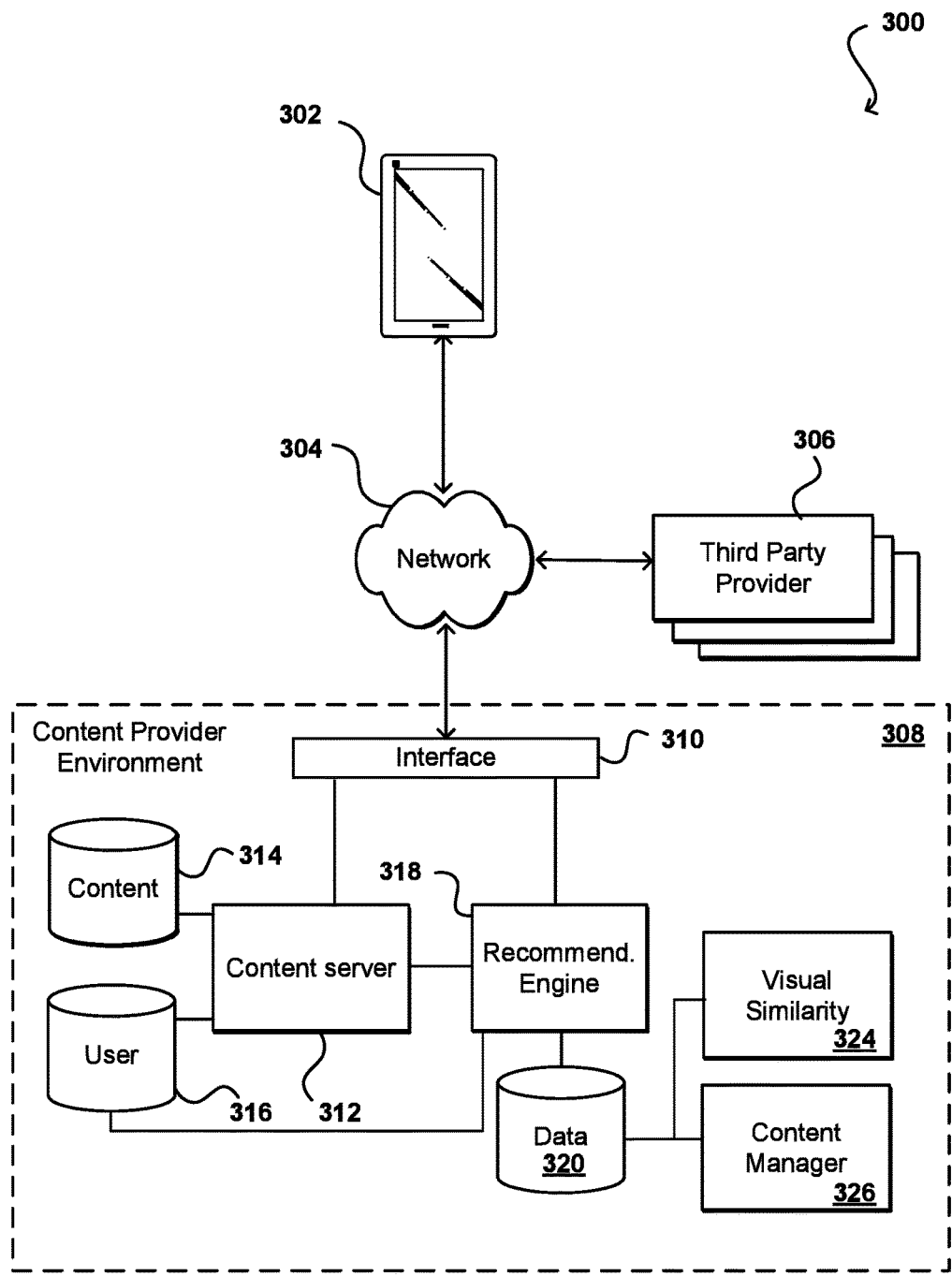
FIG. 3 illustrates an example environment in which aspects of the various embodiments can be implemented.

FIG. 3 illustrates an example environment 300 in which various embodiments can be implemented. In this example, a user is able to use a client device 302 to submit a request for content, such as a webpage or page of an electronic book, across at least one network 304. Although a portable computing device (e.g., an electronic book reader, smart phone, or tablet computer) is shown as the client device, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, wearable computers (i.e., smart watches and glasses) and portable media players, among others. The at least one network 304 can include any appropriate network, such as may include the Internet, an Intranet, a local area network (LAN), a cellular network, a Wi-Fi network, and the like. The request can be sent to an appropriate content provider environment 308, which can provide one or more services, systems, or applications for processing such requests. The content provider can be any source of digital or electronic content, as may include a website provider, an online retailer, a video or audio content distributor, an e-book publisher, and the like.

In this example, the request is received to a network interface layer 310 of the content provider environment 308. The network interface layer can include any appropriate components known or used to receive requests from across a network, such as may include one or more application programming interfaces (APIs) or other such interfaces for receiving such requests. The network interface layer 310 might be owned and operated by the provider, or leveraged by the provider as part of a shared resource or "cloud" offering. The network interface layer can receive and analyze the request from the client device 302, and cause at least a portion of the information in the request to be directed to an appropriate system or service, such as a content server 312 (e.g., a Web server or application server), among other such options. In the case of webpages, for example, at least one server 312 might be used to generate code and send content for rendering the requested Web page. In cases where processing is to be performed, such as to generate search results, perform an operation on a user input, identify content represented in images, etc., information might also be directed to at least other server for processing. The servers or other components of the environment might access one or more data stores, such as a user data store 316 that contains information about the various users, and one or more content repositories 314 storing content able to be served to those users.

As mentioned, in at least some embodiments the content to be provided can include data 320 for one or more image matches, recommendations, advertisements, or other such elements that are selected based on information for the user associated with the request, for example by providing information to a recommendation engine 318 or other such component or service, for analyzing the provided information and attempting to generate recommendations or other elements as discussed herein. In some embodiments, this can utilize content generated within the content provider environment 308 or received from one or more third party providers 306, among other such options. For example, a categorization tree can be generated using a collection of content obtained within the environment or received from the third party providers 306. As mentioned, a content manager 322 or other such component or service can analyze the images to attempt to determine portions of those images that correspond to individual items that have data stored in the content repository 314 or elsewhere in the content provider environment 308. This can include, for example, images of items available for consumption. The determined items can be categorized and a categorization tree can be generated based on the category of the items. The environment can also include a visual similarity system 324, or other such component or service, for analyzing the image portions for the individual items and attempting to locate content for similar items that are at least somewhat visually similar Again, this can include comparing the image portions, or data for those portions, against image data stored for items in the catalog. Based at least in part upon this information, the content manager 326, or other such system, service, or component, can attempt to build a categorization tree so that for any item in the catalog for which a query is received the tree can be consulted to determine a matching and/or set of related items. The content manager 326 can also be responsible for managing the categorization tree and updating the tree as new images or content is received.

Figure 4:
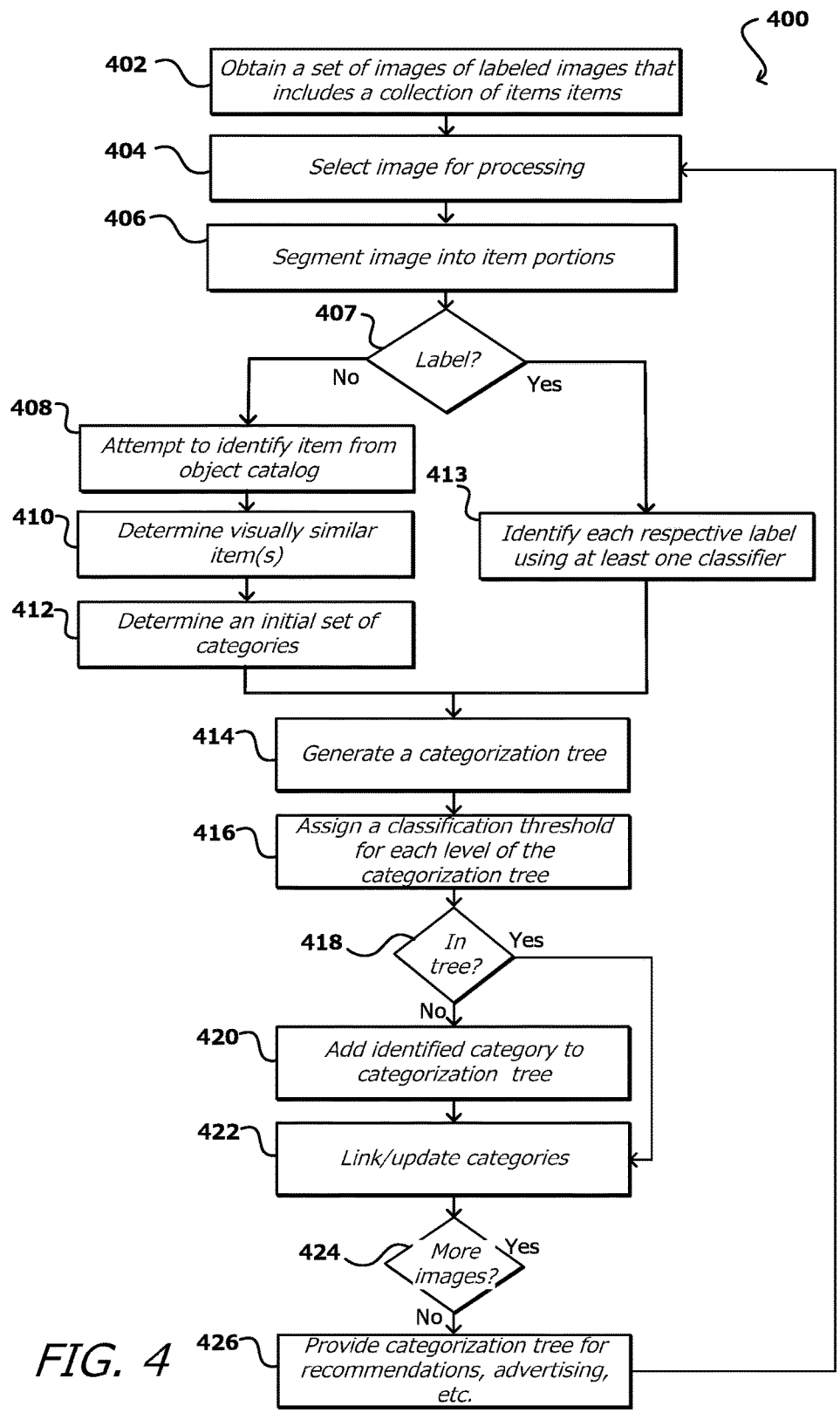
FIG. 4 illustrates an example process for generating a categorization tree that can be utilized in accordance with various embodiments.

FIG. 4 illustrates an example process 400 for generating a categorization tree that can be utilized in accordance with various embodiments. It should be understood that there can be additional, fewer, or alternative steps performed in similar or alternative orders, or in parallel, within the scope of the various embodiments unless otherwise stated. In this example, a set of images is obtained 402, where the set of images includes images of items of a collection of items. At least a portion of the set of images includes label information that describes a category of an item represented in a respective image. The set can include subsets from different sources and/or received at different times. The images may also include metadata regarding that which is represented in the images, such as may include item descriptions or identifiers, location information, collection data, category information, and the like. The images can be stored to a data store or in memory for subsequent analysis.

From the set of images, an image can be selected 404 for processing. This can include any pre-processing, such as noise removal, color or intensity adjustment, and the like. The image can be segmented 406 into item portions using an appropriate process, such as by using connected contours or background removal to identify a potential item of interest, using an object recognition or image matching process on one or more portions of the image, etc. A determination 407 can be made whether the image includes label information. In the situation where it is determined that no label information is available, an object recognition or similar process can then attempt to identify 408 each item portion from an object catalog or other such repository or image library. As discussed, this can include an image matching process that can attempt to match the portion against a library of images in an attempt to determine 410 visually similar items to find a match with sufficient confidence or certainty that the item can be considered to be identified as the product represented in the matching image. Each item in the item catalog can be associated with a product category and the association can be used to generate a categorization tree. In the situation where it is determined that label information is available, each image can be analyzed using at least one classifier to identify 413 label information for a respective image. Approaches to analyzing data to label such data are well known and/or otherwise described herein and will not be discussed in regard to this step.

The labeled images from both paths can be combined to determine 412 an initial set of categories. The initial set of categories can be based on metadata, historical action data, label information, or other data associated with the query image and/or matched image determined in the matching process, for example. The initial set of categories can include a set of higher-level categories and subcategories of a respective higher-level category. The historical interaction data can include, for example, at least one of view data, product data, consumption data, search data, purchase data, or interaction data. A categorization tree can be generated 414 that includes at least the set of higher-level categories and subcategories of a respective higher-level category. A classification threshold can be assigned 416 to each level of the categorization tree. The threshold can be based on, for example, historical interaction data, category types of a level of the categorization tree, view data, product data, consumption data, search data, purchase data, interaction data. Any number of algorithms can be used to determine a threshold, as may include probabilistic algorithms, predictive algorithms, machine learning algorithms, etc.

As additional categories are identified, a determination 418 can be made as to whether the category is already represented in the categorization tree as having been identified from a previously received image, for example. If not, the new category can be added 420 to the categorization tree and the categorization tree for which new information is available can then have links created and/or updated 422. This can include adding links to related categories, and updating links for existing categories to represent additional occurrences of categories together. If there are more images 424 the process can continue, otherwise the categorization tree can be provided 426 for use in identifying items, making recommendations, selecting advertising, or performing other such tasks.

Figure 5:
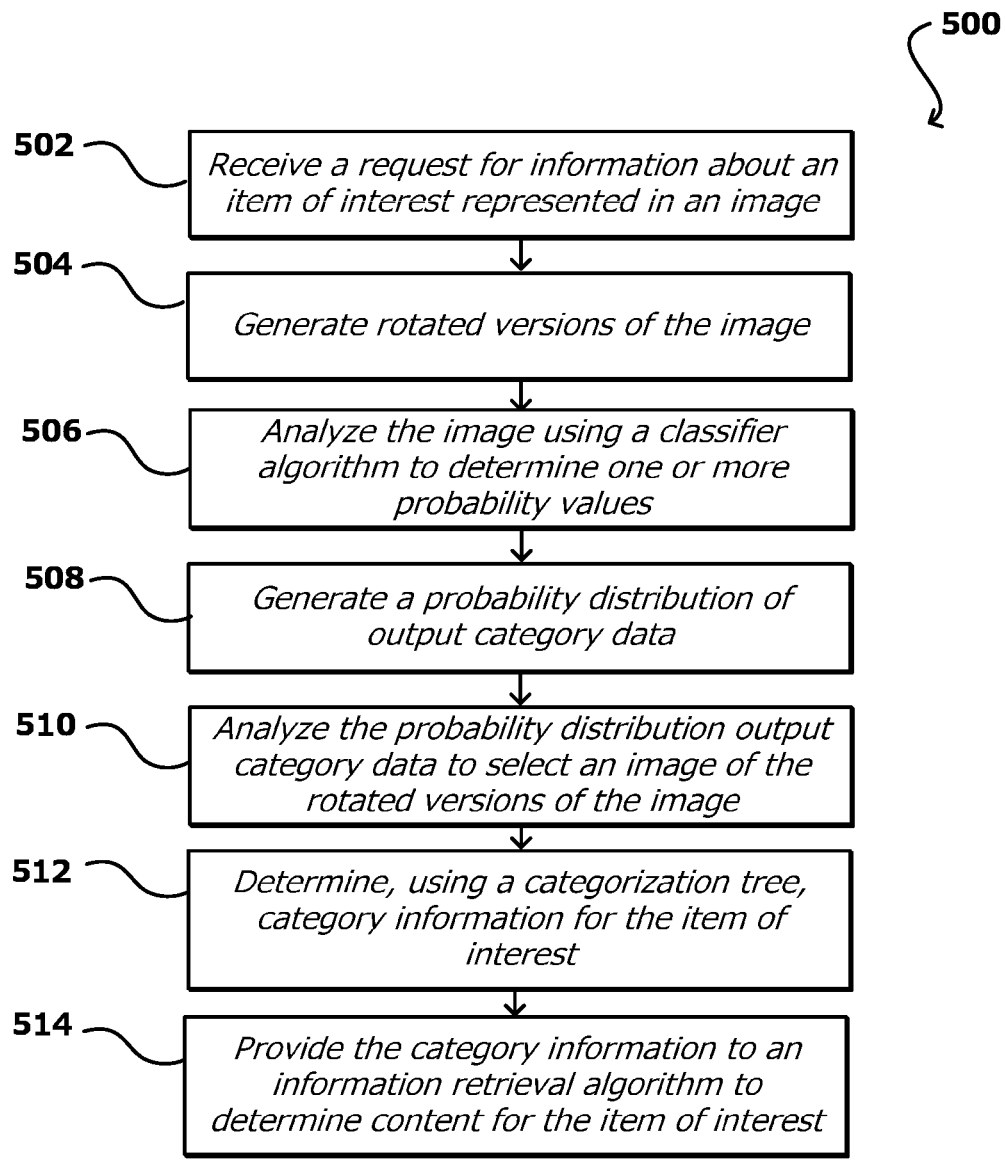
FIG. 5 illustrates an example process for utilizing a categorization tree to determine information about specific items represented in an image that can be utilized in accordance with various embodiments.

FIG. 5 illustrates an example process 500 for generating recommendations using a categorization tree such as that created in the process of FIG. 4. In this example, a request for information about a particular item of interest is received 502. The request can be received in response to a search query for the item being received, a navigation to a page associated with the item, or another such action or occurrence and can include a query image that includes a representation of an item of interest. Rotated versions of the image can be generated 504 and each of a subset of the rotated images can be analyzed to determine 506 probability values. The images can be analyzed using a classifier algorithm that has been trained for one or more categories. The probability values indicate a probability that the image includes an instance of a particular category. Analyzing the image can include, for example, generating a first rotated version of the image, the representation of the object being orientated in a first position that is rotated an amount from the reference position, generating a second rotated version of the image, the representation of the object being orientated in a second position that is rotated the amount from the first position, and analyzing the first rotated version to determine first categorization values and the second rotated version to determine second categorization values, the first categorization values and the second categorization values indicating probabilities that the object of interest is associated with an instance of a particular category of a categorization tree.

The probability values can be used to generate 508 a probability distribution of output category data and the data can be analyzed 510 to select an image of the rotated versions of the image. The categorization tree can then be utilized, whereby for the item of interest represented the image, category information representing at least a category of the item can be determined 512. The determined category can be provided 514 to an information retrieval algorithm such as an item retrieval algorithm to determine primary content for the item of interest. This information also can be used to determine recommendations, advertising, or other supplemental content, within a specific category, to be displayed with the primary content.

An advantage to such an approach is that recommendations will be selected and presented that can more likely be of interest to a user for whom sufficient information is not available to make personalized recommendations. This can help to reduce the amount of time the user needs to spend searching for items, and the number of pages or searches needed to be examined in order to find those items, which can reduce the amount of resources needed for that user session. Aspects of the present invention thus not only improve the user experience but also improve the performance of various computer systems as the amount of power, processing capacity, bandwidth, memory, and other resources needed for the session can be reduced, and the performance of the system for this and other users, as well as this and other tasks, improved.

Figure 6:
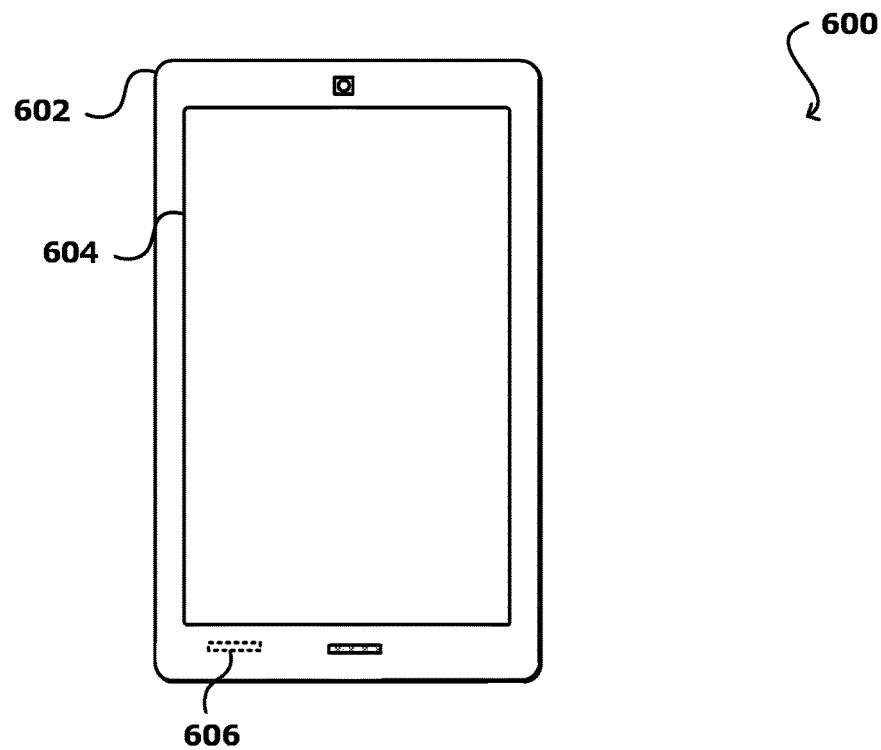
FIG. 6 illustrates an example device that can be used to implement aspects of the various embodiments.

FIG. 6 illustrates an example electronic user device 600 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 602 has a display screen 604 on the front side, which under normal operation will display information to a user facing the display screen (e.g., on the same side of the computing device as the display screen). It should be understood that computing devices such as servers, however, may not have dedicated display elements. The example computing device 600 also includes at least one networking component 606, such as a network interface card, wireless networking component, and the like, enabling the computing device to communicate information over at least one network.

Figure 7:
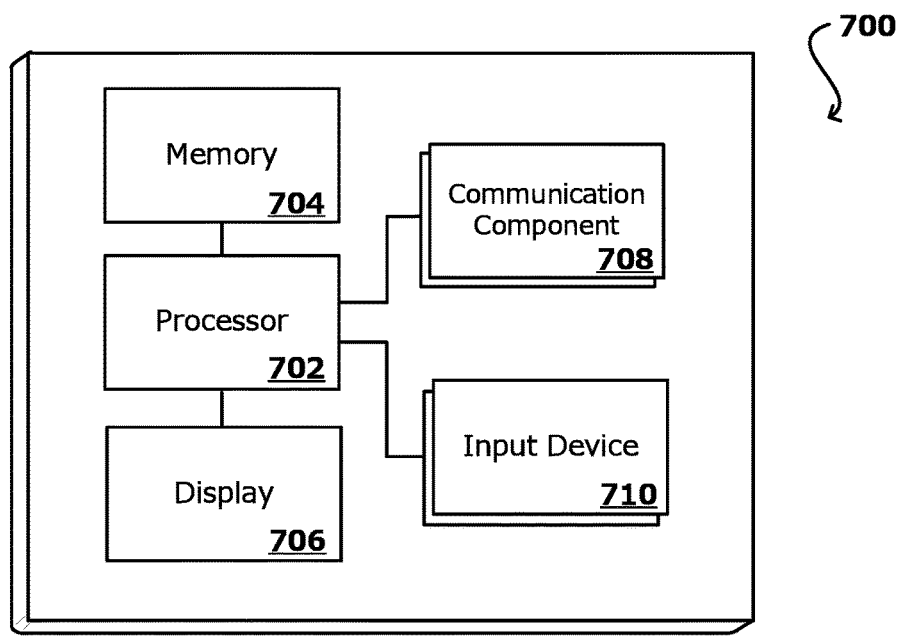
FIG. 7 illustrates example components of a client device such as that illustrated in FIG. 6.

FIG. 7 illustrates a logical arrangement of a set of general components of an example computing device 700 such as the device 600 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. In some embodiments, the computing device 700 of FIG. 7 can include one or more networking and/or communication elements 708, such as a Wi-Fi, Bluetooth, RF, wired, or wireless communication system. The device in many embodiments can communicate with a network, such as the Internet, and may be able to communicate with other such devices. In some embodiments the device can include at least one additional input component 710 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate non-transitory media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
cause a query to be executed against a data source, the query including image data that includes a representation of an object of interest orientated in a reference position;
generate a first rotated version of the image data, the representation of the object of interest being orientated in a first position that is rotated an amount from the reference position;
generate a second rotated version of the image data, the representation of the object of interest being orientated in a second position that is rotated the amount from the first position;
analyze the first rotated version to determine first categorization values and analyze the second rotated version to determine second categorization values, the first categorization values and the second categorization values indicating probabilities that the object of interest is associated with an instance of a particular category of a categorization tree;
generate a distribution of probability that includes the first categorization values and the second categorization values;
analyze the distribution of probability to select the first rotated version;
determine, using the categorization tree that includes a plurality of categories and links between those categories, classification information for the object of interest based at least in part on the first categorization values;
receive, in response to the query, result information for a set of items, the set of items determined by comparing the classification information to stored classification information for a plurality of items related to a category of the categorization tree; and
display, on a display screen, information for at least a subset of the set of items.

2. The computer-implemented method of claim 1, further comprising:
obtaining a data set including category information for each of a plurality of images, respective category information relating to a category for an item represented in a corresponding image of the plurality of images; and
training a neural network using the category information and corresponding image, the neural network configured to determine at least one category associated with an item represented in a query image.

3. The computer-implemented method of claim 1, further comprising:
determining a group of categories for which historical interaction data is available;
recognizing related categories to the group of categories based at least in part on the historical interaction data;
determining, based at least in part on the related categories, an initial set of categories, the initial set of categories including a set of higher-level categories and subcategories of a respective higher-level category; and
generate the categorization tree, the categorization tree including at least the set of higher-level categories and the subcategories.

4. The computer-implemented method of claim 3, wherein the query includes content corresponding to a determined category, the method further comprising:
obtaining user data representing historical user interaction, with respect to items in the plurality of categories;
determining, for a category of the plurality of categories, historical user interaction below a threshold amount of interaction; and
considering a subset of the initial set of categories.

5. A computer-implemented method, comprising:
obtaining image data, the image data including a representation of an object of interest orientated in a reference position;
generating a first rotated version of the image data, the representation of the object of interest being orientated in a first position that is rotated an amount from the reference position;
generating rotated versions of the image data, the representation of the object of interest being orientated in a position that is rotated an amount from the reference position for individual rotated versions;
analyzing the rotated versions to determine categorization values indicating probabilities that the object of interest is associated with an instance of a particular category of a categorization tree;
generating a distribution of probability based at least in part on the probabilities;
identifying, based at least on part on the distribution of probability and using the categorization tree that includes a plurality of categories and links between those categories, a category from the plurality of categories that includes classification information to identify items related to the object of interest; and
providing the classification information for use in determining related content associated with the object of interest, the related content corresponding to a subset of the items.

6. The computer-implemented method of claim 5, further comprising:
obtaining a data set including category information for each of a plurality of images, respective category information relating to a category for an item represented in a corresponding image of the plurality of images; and
training a classifier using the category information and corresponding image, the classifier configured to determine categorization values for a query image that includes a representation of an object of interest.

7. The computer-implemented method of claim 5, further comprising:
determining a group of categories for which historical interaction data is available;
recognizing related categories of the group of categories based at least in part on the historical interaction data;
determining, based at least in part on the related categories, an initial set of categories, the initial set of categories including a set of higher-level categories and subcategories of a respective higher-level category; and
generating the categorization tree, the categorization tree including at least the set of higher-level categories and the subcategories.

8. The computer-implemented method of claim 7, further comprising:
obtaining user data representing historical user interaction with respect to items in the plurality of categories; and
considering only a subset of the initial set of categories based at least in part on the user data.

9. The computer-implemented method of claim 7, further comprising:
determining a subset of higher-level categories that is relevant to a specified category; and
considering a subset of the higher-level categories to provide the classification information for use in determining related content.

10. The computer-implemented method of claim 7, further comprising:
recognizing related categories based at least in part on metadata included with a plurality of images, each image of the plurality of images including a representation of an item, the metadata including labeling information that identifies a product category of at least a subset of the items represented in the image.

11. The computer-implemented method of claim 5, wherein the categorization tree includes subcategories of a respective category of the plurality of categories, the method further comprising:
assigning a classification threshold to each level of the plurality of categories; and identifying the respective category based at least in part on the distribution of probability and the classification threshold assigned to each level of the plurality of categories.

12. The computer-implemented method of claim 11, wherein the classification threshold is determined based at least in part on a data set including category information for each of a plurality of images, at least a subset of the plurality of images each including a representation of an item.

13. The computer-implemented method of claim 11, further comprising:
assigning the classification threshold to each level of the plurality of categories based at least in part on a category type of a respective category.

14. The computer-implemented method of claim 5, wherein the classification information is a feature vector including a plurality of feature values, each feature value corresponding to a classification probability.

15. A system, comprising:
at least one processor; and
memory including instructions that, when executed by the at least one processor, enable the system to:
obtain image data, the image data including a representation of an object of interest orientated in a reference position;
generate rotated versions of the image data, the representation of the object of interest being orientated in a position that is rotated an amount from the reference position for individual rotated versions;
analyzing the rotated versions to determine categorization values indicating probabilities that the object of interest is associated with an instance of a particular category of a categorization tree;
generate a distribution of probability based at least in art on the probabilities;
identify, using the categorization tree that includes a plurality of categories and links between those categories, a category of the plurality of categories that includes classification information to identify items related to the object of interest based at least on part on the distribution of probability; and
provide the classification information for use in determining related content associated with the object of interest, the related content corresponding to a subset of the items.

16. The system of claim 15, wherein the image data includes a set of images, and wherein the instructions when executed further enable the system to:
segment an image from the set of images into at least one item portion, the at least one item portion including a representation of an object of interest;
analyze a representation of the at least one item portion to determine a set of features corresponding to the item portion;
compare the set of features to stored items features to determine a matching item, the matching item being associated with a product category; and
determining, based at least in part on the product category of the matching item, an initial set of categories of the categorization tree.

17. The system of claim 15, wherein the instructions when executed further enable the system to:
determine a group of categories for which visual similarity data is available;
recognize related categories of the group of categories based at least in part on matching the visual similarity data to stored visual information associated for a plurality of items related to a category of the categorization tree;
determine, based at least in part on the related categories, an initial set of categories, the initial set of categories including a set of higher-level categories and subcategories of a respective higher-level category; and
generate the categorization tree, the categorization tree including at least the set of higher-level categories and the subcategories.

18. The system of claim 15, wherein the instructions when executed further enable the system to:
determine a group of categories for which historical interaction data is available;
recognize related categories of the group of categories based at least in part on the historical interaction data;
determine, based at least in part on the related categories, an initial set of categories, the initial set of categories including a set of higher-level categories and subcategories of a respective higher-level category; and
generate the categorization tree, the categorization tree including at least the set of higher-level categories and the subcategories, wherein the historical interaction data includes at least one of view data, product data, consumption data, search data, purchase data, or interaction data.

19. The system of claim 15, wherein the instructions when executed further enable the system to:
identify a data set including historical interaction data for a set of categories; and
use a first portion of the data set to train a classifier and a second portion of the data set to test the classifier.

* * * * *